United States Patent
Henson et al.

(10) Patent No.: US 6,854,584 B2
(45) Date of Patent: Feb. 15, 2005

(54) LINEAR BELT SORTER AND METHODS OF USING LINEAR BELT SORTER

(75) Inventors: Mark W. Henson, Danville, KY (US); Charles O. Burdine, II, Somerset, KY (US); Arlo Stephen Bromley, Mason, OH (US)

(73) Assignee: FKI Logistex Automation, Inc., Cincinnati, OH (US)

( * ) Notice: Subject to any disclaimer, the term of this patent is extended or adjusted under 35 U.S.C. 154(b) by 0 days.

(21) Appl. No.: 10/702,779

(22) Filed: Nov. 6, 2003

(65) Prior Publication Data

US 2004/0089514 A1 May 13, 2004

Related U.S. Application Data

(63) Continuation-in-part of application No. 10/292,224, filed on Nov. 12, 2002, now Pat. No. 6,669,001.

(51) Int. Cl.[7] .............................................. B65G 47/10
(52) U.S. Cl. ............................ 198/370.06; 198/370.02; 198/370.1
(58) Field of Search ........................ 198/370.1, 370.02, 198/370.03, 358, 370.06, 370.07, 370.08, 371.2; 209/659, 678

(56) References Cited

U.S. PATENT DOCUMENTS

| | | | |
|---|---|---|---|
| 4,096,936 A | 6/1978 | Nielsen | |
| 4,763,771 A | 8/1988 | Geerts | |
| 4,781,281 A | 11/1988 | Canziani | |
| 4,815,582 A | 3/1989 | Canziani | |
| 4,884,676 A | 12/1989 | Suizu | |
| 4,930,613 A | 6/1990 | Okura et al. | |
| 5,165,515 A | 11/1992 | Nitschke et al. | |
| 5,690,209 A | 11/1997 | Kofoed | |
| 5,901,830 A | 5/1999 | Kalm et al. | |
| 6,139,240 A | 10/2000 | Ando | |
| 6,273,268 B1 | 8/2001 | Axmann | |
| 6,513,642 B1 | 2/2003 | Shearer, Jr. et al. | |
| 6,533,125 B1 * | 3/2003 | Jensen | 198/370.02 |
| 6,669,001 B1 * | 12/2003 | Bromley et al. | 198/370.06 |
| 6,669,012 B1 * | 12/2003 | Yoshida et al. | 198/370.06 |

* cited by examiner

Primary Examiner—James R. Bidwell
(74) Attorney, Agent, or Firm—Kenneth F. Pearce

(57) ABSTRACT

The invention is particularly useful for sorting, altering or maintaining the orientation items of differing sizes moved by a sorter. The endless loop's carriers include belts that both transport and sort the items. Followers clasp the belts about the lengthwise periphery of the carriers' slats and also engage lines, diverters, crossovers and receivers. When a follower is diverted toward a crossover, transverse motion is imparted to its corresponding carrier's belt. Routers can be incorporated into the sorter for enhancing the control of the orientation and sortation of items advanced by the endless loop's carriers.

32 Claims, 20 Drawing Sheets

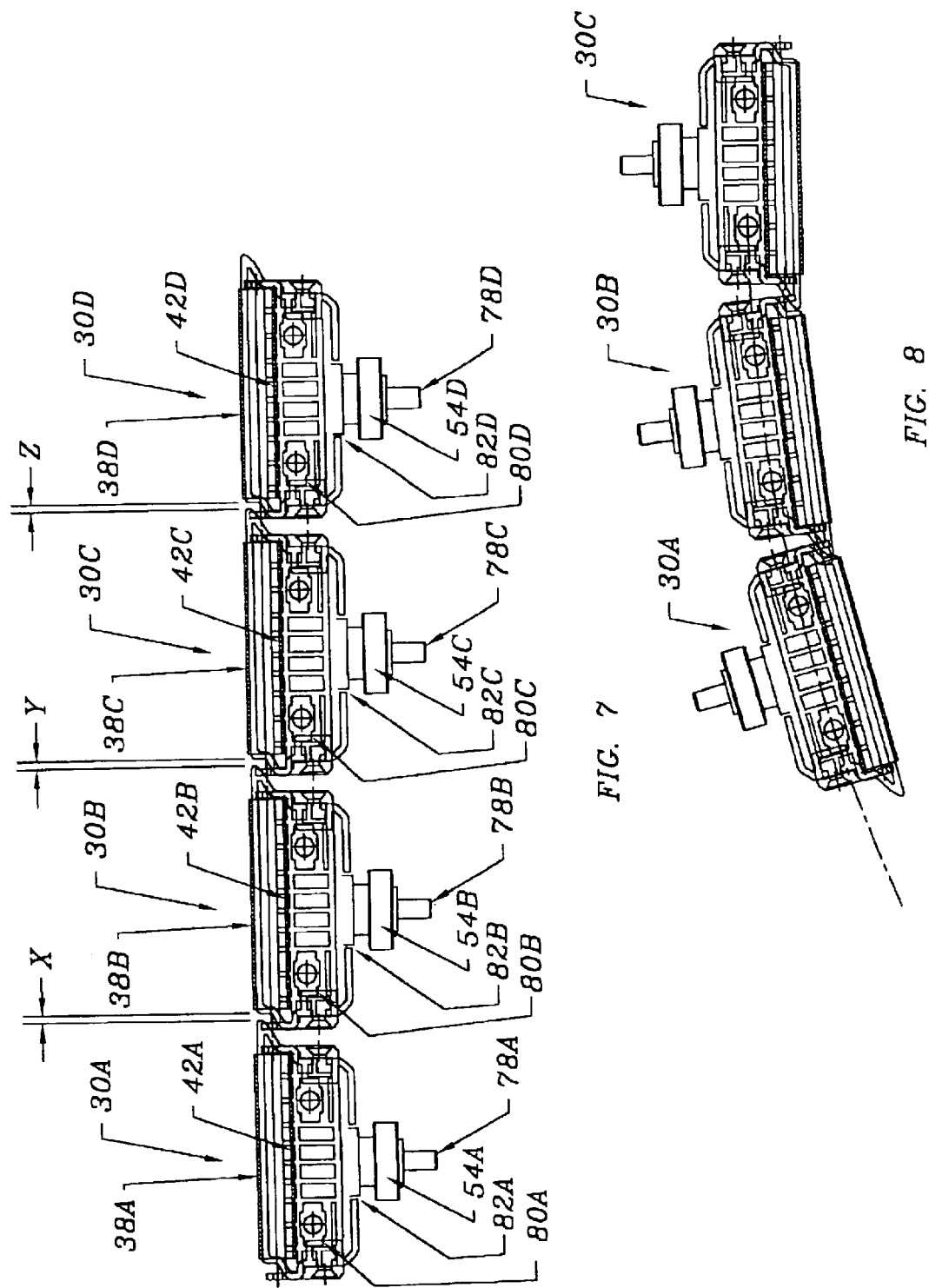

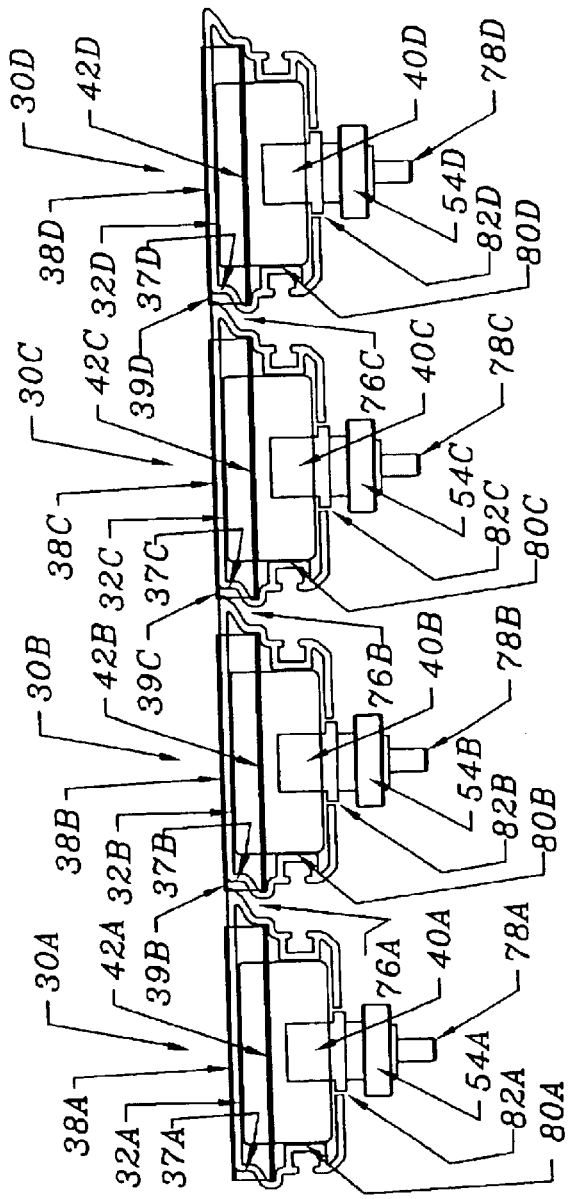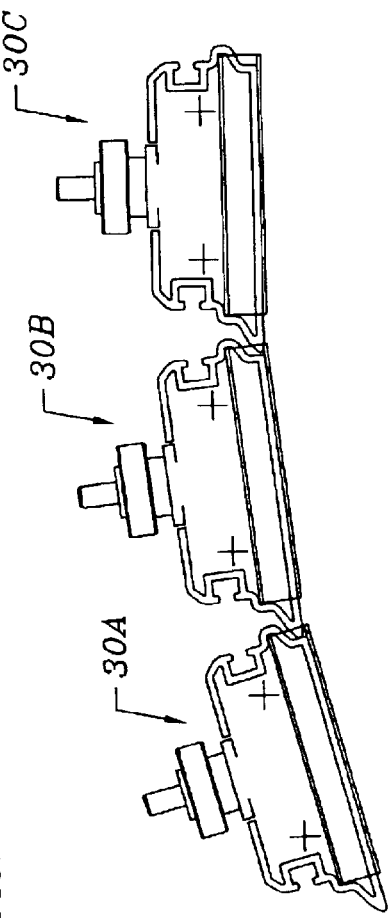
FIG. 10
FIG. 11

FIG 16

Mounting Lines, Crossovers And Controller Circuitry To The Sorter's Frame
↓

Securing One Or More Routers To The Frame To Communicate With The Lines
↓

Creating A Plurality Of Carriers Forming The Sorter's Endless Loop By:

1) wrapping belts about one or more of the slats
    2) clasping securely the belts about the slats with followers
    3) depending riders from one or more of the followers
    4) forming guide bearings beneath one or more of the slats
    5) including slits in one or more of the guide bearings
    5) incorporating delays into one or more of the followers
    6) protruding belts over a first lengthwise edge of the slats
    7) incorporating a roller at each end of the slats
↓

Advancing The Endless Loop
↓

Loading Items Onto The Endless Loop
↓

Sensing Sizes Of The Items Traveling Along The Sorter And Reporting The Sizes To The Controller
↓

Adjusting Orientation Of The Items Traveling Along The Sorter,
According To A Predetermined Paradigm

FIG 17

Mounting Lines, Crossovers And Controller Circuitry To The Sorter's Frame

Securing One Or More Routers To The Frame To Communicate With The Lines

Creating A Plurality Of Carriers Forming The Sorter's Endless Loop By:

1) wrapping belts about one or more of the slats
    2) clasping securely the belts about the slats with followers
    3) depending riders from one or more of the followers
    4) forming guide bearings beneath one or more of the slats
    5) including slits in one or more of the guide bearings
    5) incorporating delays into one or more of the followers
    6) protruding belts over a first lengthwise edge of the slats
    7) incorporating a roller at each end of the slats

Advancing The Endless Loop

Ingressing Laterally And Loading Frontally Some Of The Items Onto The Endless Loop

Sensing Sizes Of The Items Traveling Along The Sorter And Reporting The Sizes
To The Controller

Adjusting Orientation Of The Items Traveling Along The Sorter,
According To A Predetermined Paradigm

Egressing Laterally Some Of The Items Away From The Endless Loop

FIG 18

Mounting Lines, Crossovers And Controller Circuitry To The Sorter's Frame

Securing One Or More Routers To The Frame To Communicate With The Lines

Engineering The Routers For A First Portion Of Each Of The Routers' Crossovers To Be In Parallel Relationship With Each Other

Creating A Plurality Of Carriers Forming The Sorter's Endless Loop By:

1) wrapping belts about one or more of the slats
    2) clasping securely the belts about the slats with followers
    3) depending riders from one or more of the followers
    4) forming guide bearings beneath one or more of the slats
    5) including slits in one or more of the guide bearings
    5) incorporating delays into one or more of the followers
    6) protruding belts over a first lengthwise edge of the slats
    7) incorporating a roller at each end of the slats

Advancing The Endless Loop

Ingressing Laterally And Loading Frontally Some Of The Items Onto The Endless Loop

Sensing Sizes Of The Items Traveling Along The Sorter And Reporting The Sizes To The Controller

Adjusting Orientation Of The Items Traveling Along The Sorter, According To A Predetermined Paradigm

Egressing Laterally Some Of The Items Away From The Endless Loop

FIG 19

Mounting Lines, Crossovers And Controller Circuitry To The Sorter's Frame
↓

Securing One Or More Routers To The Frame To Communicate With The Lines
↓

Engineering The Routers For A First Portion Of Each Of The Routers' Crossovers To Be In Parallel Relationship With Each Other
↓

Creating A Plurality Of Carriers Forming The Sorter's Endless Loop By:

1) wrapping belts about one or more of the slats
2) clasping securely the belts about the slats with followers
3) depending riders from one or more of the followers
4) forming guide bearings beneath one or more of the slats
5) including slits in one or more of the guide bearings
5) incorporating delays into one or more of the followers
6) protruding belts over a first lengthwise edge of the slats
7) incorporating a roller at each end of the slats
↓

Advancing The Endless Loop
↓

Ingressing Laterally And Loading Frontally Some Of The Items Onto The Endless Loop
↓

Diverting Simultaneously One Or More Of The Followers Concurrently With The Lateral Ingress Of One Or More Of The Items Onto The Sorter And/Or
Diverting Sequentially One Or More Of The Followers Concurrently With The Lateral Ingress Of One Or More Of The Items Onto The Sorter
↓

Sensing Sizes Of The Items Traveling Along The Sorter And Reporting The Sizes To The Controller
↓

Adjusting Orientation Of The Items Traveling Along The Sorter, According To A Predetermined Paradigm
↓

Egressing Laterally Some Of The Items Away From The Endless Loop
↓

Diverting Simultaneously One Or More Of The Followers Prior To The Lateral Egress Of One Or More Of The Items Away From The Sorter And/Or
Diverting Sequentially One Or More Of The Followers Prior To The Lateral Egress Of One Or More Of The Items Away From The Sorter

FIG 20

Mounting Lines, Crossovers And Controller Circuitry To The Sorter's Frame

Securing One Or More Routers To The Frame To Communicate With The Lines

Engineering The Routers For A First Portion Of Each Of The Routers' Crossovers To Be In Parallel Relationship With Each Other

Creating A Plurality Of Carriers Forming The Sorter's Endless Loop By:

1) wrapping belts about one or more of the slats
2) clasping securely the belts about the slats with followers
3) depending riders from one or more of the followers
4) forming guide bearings beneath one or more of the slats
5) including slits in one or more of the guide bearings
5) incorporating delays into one or more of the followers
6) protruding belts over a first lengthwise edge of the slats
7) incorporating a roller at each end of the slats

Advancing The Endless Loop

Ingressing Laterally And Loading Frontally Some Of The Items Onto The Endless Loop

Sensing Sizes Of The Items Traveling Along The Sorter And Reporting The Sizes To The Controller

Diverting Simultaneously Some Of The Followers Concurrently With The Lateral Ingress Of One Or More Of The Items Onto The Sorter And/Or
Diverting Sequentially, In The Direction Of The Oncoming Item Or In The Direction Toward The Oncoming Item, Some Of The Followers Concurrently With The Lateral Ingress Of One Or More Of The Items Onto The Sorter

Sensing Sizes Of The Items Traveling Along The Sorter And Reporting The Sizes To The Controller

Adjusting Orientation Of The Items Traveling Along The Sorter, According To A Predetermined Paradigm

Egressing Laterally Some Of The Items Away From The Endless Loop

Diverting Simultaneously Some Of The Followers Prior To The Lateral Egress Of One Or More Of The Items Away From The Sorter And/Or
Diverting Sequentially Some Of The Followers Prior To The Lateral Egress Of One Or More Of The Items Away From The Sorter

FIG 21

Mounting Lines, Crossovers And Controller Circuitry To The Sorter's Frame

Securing One Or More Routers To The Frame To Communicate With The Lines

Engineering The Routers For A First Portion Of Each Of The Routers' Crossovers To Be In Parallel Relationship With Each Other

Creating A Plurality Of Carriers Forming The Sorter's Endless Loop By:

1) wrapping belts about one or more of the slats
      2) clasping securely the belts about the slats with followers
      3) depending riders from one or more of the followers
      4) forming guide bearings beneath one or more of the slats
      5) including slits in one or more of the guide bearings
      5) incorporating delays into one or more of the followers
      6) protruding belts over a first lengthwise edge of the slats
      7) incorporating a roller at each end of the slats

Advancing The Endless Loop

Ingressing Laterally And Loading Frontally Some Of The Items Onto The Endless Loop

Sensing Sizes Of The Items Traveling Along The Sorter And Reporting The Sizes To The Controller

Diverting Simultaneously Some Of The Followers Concurrently With The Lateral Ingress Of One Or More Of The Items Onto The Sorter And/Or
Diverting Sequentially, In The Direction Of The Oncoming Item Or In The Direction Toward The Oncoming Item, Some Of The Followers Concurrently With The Lateral Ingress Of One Or More Of The Items Onto The Sorter

Sensing Sizes Of The Items Traveling Along The Sorter And Reporting The Sizes To The Controller

Adjusting Orientation Of The Items Traveling Along The Sorter, According To A Predetermined Paradigm

Egressing Laterally Some Of The Items Away From The Endless Loop

Diverting Simultaneously And Orthogonally Some Of The Followers Prior To The Lateral Egress Of One Or More Of The Items Away From The Sorter And/Or
Diverting Sequentially Some Of The Followers Prior To The Lateral Egress Of One Or More Of The Items Away From The Sorter

FIG 22

M unting Lines, Crossovers And Controller Circuitry To The Sorter's Frame
⬇

Securing One Or More Routers To The Frame To Communicate With The Lines
⬇

Engineering The Routers For A First Portion Of Each Of The Routers' Crossovers To Be In Parallel Relationship With Each Other And Engineering A Second Portion Of Each Of The Routers' Crossovers To Intersect With The First Portion Of The Routers' Crossovers
⬇

Creating A Plurality Of Carriers Forming The Sorter's Endless Loop By:

1) wrapping belts about one or more of the slats
2) clasping securely the belts about the slats with followers
3) depending riders from one or more of the followers
4) forming guide bearings beneath one or more of the slats
5) including slits in one or more of the guide bearings
5) incorporating delays into one or more of the followers
6) protruding belts over a first lengthwise edge of the slats
7) incorporating a roller at each end of the slats
⬇

Advancing The Endless Loop
⬇

Ingressing Laterally And Front Loading Some Of The Items Onto The Endless Loop
⬇

Sensing Sizes Of The Items Traveling Along The Sorter And Reporting The Sizes To The Controller
⬇

Diverting Simultaneously Some Of The Followers Concurrently With The Lateral Ingress Of One Or More Of The Items Onto The Sorter And/Or
Diverting Sequentially Some Of The Followers Concurrently With The Lateral Ingress Of One Or More Of The Items Onto The Sorter And/Or
⬇

Sensing Sizes Of The Items Traveling Along The Sorter And Reporting The Sizes To The Controller
⬇

Adjusting Orientation Of The Items Traveling Along The Sorter, According To A Predetermined Paradigm
⬇

Egressing Laterally Some Of The Items Away From The Endless Loop
⬇

Diverting Simultaneously Some Of The Followers Prior To The Lateral Egress Of One Or More Of The Items Away From The Sorter And/Or
Diverting Sequentially Some Of The Followers Prior To The Lateral Egress Of One Or More Of The Items Away From The Sorter And/Or

LINEAR BELT SORTER AND METHODS OF USING LINEAR BELT SORTER

This Application for Letters Patent relates back to non-provisional utility application, Ser. No. 10/292,224; filed Nov. 12, 2002; Bromley, Arlo S., et. al.; entitled—Linear Belt Sorter And Methods Of Using Linear Belt Sorter—and is a continuation-in-part of the Ser. No. 10/292,224 filed Nov. 12, 2002, now U.S. Pat. No. 6,669,001 application that is incorporated herein by reference. In accordance with Title 35 of the United States Code, Applicants demand all rights and benefits flowing from the Ser. No. 10/292,224 application be accorded to this co-pending application for Letters Patent.

BACKGROUND OF THE INVENTION

1. Field of the Invention

The present invention relates to endless loop sorters which have carriers that utilize belts to transport, control spatial orientation and sort numerous items. Followers clasp the belts about the lengthwise periphery of the carriers' slats. The followers also move about the lengths of their respective slats. Select embodiments equip the carriers with guide bearings for the followers. In other embodiments, riders depend downward from the followers' clasps and through slits in the guide bearings to engage lines, diverters, crossovers or receivers. When a diverter diverts a follower from a line toward a crossover transverse motion is imparted to the carrier's belt. Routers incorporating clusters of diverters, crossovers and receivers are used in select embodiments of the current sorter. Use of routers allows a program to control the spatial orientation of items as the items travel along the sorter's endless loop.

2. Description of the Previous Art a) U.S. Pat. No. 4,930,613—Okura, et. al., enables a carrier including a flat belt (6). The flat belt (6) is capable of transferring items to be sorted at angles transverse to the forward movement of Okura's carrier. Two end portions of the belt (6) are fitted alternately in a folded back manner on the two side rollers (4) and inner rollers (5) and thereafter fixed to two sides of the carrier. Okura's carrier further includes his moving frame (3) that includes a depending roller (7) and depending pin (8). Pen (8) and roller (7) engage actuators (9a–9d) disposed in the transferring passage (2). The '613 moving frame (3) is formed by folding two ends of a narrow plate upward and equipping the frame (3) with a plurality of horizontal (19) and vertical (20) wheels. These wheels engage a pair of guide rails (21), and in operation, the Okura frame (3) moves at a right angle with respect the directional movement of the carrier (1). Importantly, for the '613 invention to function, inner rollers (5) must be arranged inside moving frame (3).

b) U.S. Pat. No. 4,884,676—Suizu teaches a type of cross-belt sorter. Suizu's belt (11) circumscribes his moving frame (4) while rollers (5) engage rails (2) and support the moving frame (4). The '676 drive pulley (13) causes belt (11) to move at right angles as compared with the forward motion of the moving frame (4). As enabled, Suizu's combination of friction wheels (16, 17), drive pulley (13), shafts (16a, 17a), bevel gear (24), shaft (24a), bearings (25), shaft (13a), sprockets (26, 27) and endless chain (28) form the transmission for moving frame (4). In operation, the belt (11) is able to move transversely due to Suizu's elaborate transmission.

c) U.S. Pat. No. 3,231,068—Harrison, et. al. describes an article delivery conveyor. Harrison's conveyor includes platforms (20). Among other structures, each platform includes a plurality of cleated belts (30, 32). The Harrison conveyor utilizes a rack and pinion (46, 48), shaft (36), pulley (38), discs (28), belt (40) and pulley (42) to move cleated belts (30, 32) in a direction perpendicular to the forward movement of the platforms (20).

d) U.S. Pat. No. 4,096,936—Nielson discloses a cross belt sorting conveyor. Among other structures, Nielson's belt (2) is supported by a plurality of wheels (26) mounted in brackets (28) which in turn are carried on vertical shaft pins (30) rotably secured to the base plate (32). Importantly, the '936 belt elements (4) rest on the top of wheels (26) directly with the lower side of the individual cross conveyor belts (12).

e) U.S. Pat. No. 6,273,268—Axmann enables a conveyor system for sorting piece goods. Axmann's combination of electro-magnetically or pneumatically actuated friction strips (36), friction wheel (32), shaft (31), bevel gear (30) and friction rollers (26) drive the sorting device's conveyor belt (18) to revolve toward an ejection station. Since the '268 Patent's friction wheel can be actuated in either direction, the Axmann belt can eject piece goods to either side of the conveyor.

f) U.S. Pat. No. 5,901,830—Kalm, et. al., discloses an electrically actuated bi-directional belt sorter. The '830 carrier (10) includes a pair of rollers (31, 32) supported at opposite ends of the top (12) of the carrier (10). Kalm's drive motor (38) is powered by the electrified track (200). The conveyor belt (36) is actuated by the rollers (31, 32), and in the preferred embodiment, drive belt (52) connects a pair of drive pulleys (54, 56). Kalm's drive pulley (54) is connected to roller (32) while drive pulley (56) is connected to the output shaft (40) of drive motor (38).

g) U.S. Pat. No. 4,781,281—Canziani defines a conveyor and discharge system for sorting items. Using a pair of rolls (4,5), Canziani mounts belt (3) to his carriage (1). The shaft (6) of roll (4) is keyed to pinion (7) for engaging corresponding pinion (8) of shaft (9). When wheel (12) of shaft (9) is seized between belts (13, 14), rotary motion is transmitted to roll (4) causing the belt (3) to rotate to discharge any item thereon.

h) U.S. Pat. No. 4,815,582—Canziani describes a cross-belt sorting apparatus incorporating permanent magnet D.C. electric motors to rotate the rotary belts (5, 14).

i) U.S. Pat. No. 5,690,209—Kofoed enables a cross-belt sorter. The '209 Patent utilizes electric motors for driving each carrier's belt transverse to the movement of the Kofoed endless loop which is consists of a plurality of chassis linked together to form a continuous chain.

j) U.S. Pat. No. 4,763,771—Geerts discloses a sorter utilizing trolleys. Among other structures, the Geerts trolley consists of an endless belt (7) running over pulleys (6). The pulleys (6) are fixed on axle (24). A first cable (25) and a second cable (27) are each wound around the axle (24). The combination of the cables, the axle and the pulleys drive the belt (7) to throw its load off.

k) U.S. Pat. No. 6,513,642 B1—Shearer, et. al. enables a conveyor system having divert shoes that move transversely across the conveying surface. Among other things, Shearer teaches a diverting track network (30) that includes upstream diverting tracks (40) and downstream diverting tracks (50). Each upstream diverting track (40) terminates part way across the conveying surface (1). Downward depending portions of diverting shoes (14) are diverted to specific upstream diverting tracks (40a) through (40g), and downstream diverting tracks (40a) through (40g), and downstream tracks (50a) and (50b) by a dedicated diverter (25a) through (25i). When diverting shoes (14) are not being utilized to push an article off main conveyor (9) and onto branch conveyor (5), they travel in sequence along shoe guideway (8). And when a particular package (70) is to be diverted onto the branch conveyor (5), a signal is sent from control system (60) to divert control module (26) to cause the selective actuation of diverter (25a) and a least one of diverters (25b) through (25i) to divert at least two diverting shoes (14).

i) U.S. Pat. No. 5,165,515—Nitschke, et. al. discloses a segmented pusher controller for a conveyor. A diverter shoe (16) is mounted to each slat (14) and is movable laterally along the slat with respect to the slat. Shoe actuation associated with each sortation spur (18) is provided to imparting lateral force on the shoes (16) to push packages onto the spur. Nitschke utilizes a guide track network positioned below the conveying surface (12) to direct shoes (16).

j) U.S. Pat. No. 6,139,240—Ando discloses an orthogonal branching conveyor for diverting articles carried by a conveyor in an automated warehouse. The Ando conveyor utilizes shoes mounted to slats to push articles off of his conveyors.

SUMMARY OF THE INVENTION

Unlike traditional belt-type sorters, known more commonly as cross-belt sorters, when the size of the item to be sorted is larger than the width of a single belt, the present apparatus can divert two or more of the endless loop's followers in sequence or simultaneously. In accordance with present invention, sequential movement of the carrier's belts can alter the orientation of the item being advanced by the sorter's endless loop. Clustering of diverters, their corresponding crossovers and receivers creates the current sorter's routers, and use of one or more routers enhances the sorters ability to control the spatial orientation of items carried or sorted by the sorter's carriers. In other embodiments, when the size of the item to be sorted is smaller than or about the width of a single belt, a single follower is diverted which precipitates sortation of the smaller item.

A controller or computer program activates the diverters to divert the sorter's followers. When a follower is diverted, transverse motion is imparted to the carrier's belt. In select embodiments, electromagnetic induction can be used to guide the followers, but more often, mechanical tracks, electromechanical diverters, mechanical crossovers and mechanical receivers direct the sorter's followers as the endless loop is advanced. In many embodiments, the sorter's followers are guided about the length of the carriers' slats by the carriers' guide bearings, but the carriers can be sized so that the followers do not travel the entire lengths of the slats. Gaps between the sorter's carriers can be eliminated by protruding the carriers' belts over the lengthwise edges of the carriers slats. Importantly and regardless of the embodiment practiced, the carriers are dimensioned to pivot through a reverse bend or reverse pivot, when required, as the endless loop circulates or advances about the sorter.

An object of the present invention is to provide a sorter utilizing carrier belts for sorting items.

It is another object of the present invention to enable methods of using the sorter.

Still another object of the present invention is to provide clasping followers for the sorter's carriers.

Yet still another object of the present invention is to reduce wear and tear on the diverters.

Still another object of the present invention is to eliminate or virtually eliminate the gaps between the endless loop's carriers.

Yet another object of the present invention is to dimension the endless loop's carriers to pivot through a reverse bend or reverse pivot.

It is another object of the present invention to provide a sorter capable of sorting differing sized items traveling along the endless loop.

Still another object of the present invention is to divert a single follower, thereby activating a single carrier's belt to sort a single item.

Yet another object of the present invention is to sequentially divert some of the sorter's followers, thereby sorting an item or altering the orientation of the item as it is advanced by the sorter's endless loop.

It is yet another object of the present invention to provide an embodiment that can simultaneously divert some of the sorter's followers.

Still another object of the present invention is to provide an embodiment that can simultaneously and/or sequentially divert some of the sorter's followers.

Yet another object of the present invention is to utilize one or more routers to control spatial orientation of items advanced by the sorter's endless loop.

It is yet another object of the present invention to utilize one or more routers to control sortation of items advanced by the sorter's endless loop.

It is another object of the present invention to provide an endless loop that may be utilized with preexisting frames, lines, diverters, crossovers, switches, receivers, so forth and so on.

An embodiment of the present invention can be described a sorter for sorting a plurality of items, comprising: an endless loop having an upper half positioned above a lower half where the endless loop further includes a plurality of carriers circulating about said endless loop, wherein one or more of said carriers further comprises: a slat, a belt, a follower and connectors; a plurality of lines for directing advancement of any of the plurality of carriers' followers; a plurality of crossovers, communicating with at least two of the plurality of lines, for guiding transversely, relative to the endless loop's advancement, any of the plurality of carriers' followers; a plurality of diverters for diverting any follower from any of the plurality of lines onto one or more of the plurality of crossovers; a drive; a frame; a controller; a frontal ingress for the sorter; and a lateral ingress for the sorter.

Another embodiment of the present apparatus can be described a sorter for sorting a plurality of items, comprising: an endless loop comprising carriers, wherein one or more of said carriers further comprises: a slat, a belt, a follower and connectors; a plurality of lines for directing advancement of any of the plurality of carriers' followers; a plurality of crossovers; a plurality of diverters; a drive; a sensor; a frame; and a controller.

Still another embodiment of the present invention can be described as a method of controlling orientation of items traveling along an endless loop of a sorter, comprising the steps of: providing a frame; mounting a plurality of lines to the frame; securing a router to the frame; creating a plurality of carriers comprising the endless loop, wherein creation of one or more of the carriers further comprises the steps of: wrapping a belt about a slat, clasping securely the belt about the slat with a follower, depending a rider from the follower;

advancing the endless loop; loading items onto the endless loop; sensing sizes of the items traveling along the sorter; adjusting orientation of the items traveling along said sorter, according to a predetermined paradigm.

Yet another embodiment of the present device can be described as a sorter for sorting a plurality of items, comprising: an endless loop including carriers where one or more of the carriers further comprise: a slat, a belt and a follower; a drive; a plurality of lines for directing advancement of any of the carriers' followers; a router; a sensor; a controller and frame.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

BRIEF DESCRIPTION OF THE DRAWINGS

FIG. 7 is a side view of a section of the endless loop, with the frame, cross-members, drive and connectors cut away.

FIG. 8 is lateral view of a portion of FIG. 7's carriers disclosing the reverse pivot configuration.

FIG. 10 is a sectional side view of another embodiment of the present invention.

FIG. 11 is lateral view of a portion of FIG. 10's carriers disclosing the reverse pivot configuration.

FIG. 16 is an exemplification of the steps of another embodiment of the current method.

FIG. 17 is a depiction of the steps of still another embodiment of the present invention.

FIG. 18 is an illustration of the steps of yet another embodiment of the present method.

FIG. 19 is an exemplification of the steps of yet another embodiment of the current method.

FIG. 20 is yet another exemplification of the steps of another embodiment of the current method.

FIG. 21 is a depiction of the steps of still another embodiment of the present invention.

FIG. 22 is an illustration of the steps of yet another embodiment of the present method.

DESCRIPTION OF THE PREFERRED EMBODIMENTS

Although the disclosure hereof is detailed to enable those skilled in the art to practice the invention, the embodiments published herein merely exemplify the present invention.

Figure 1:
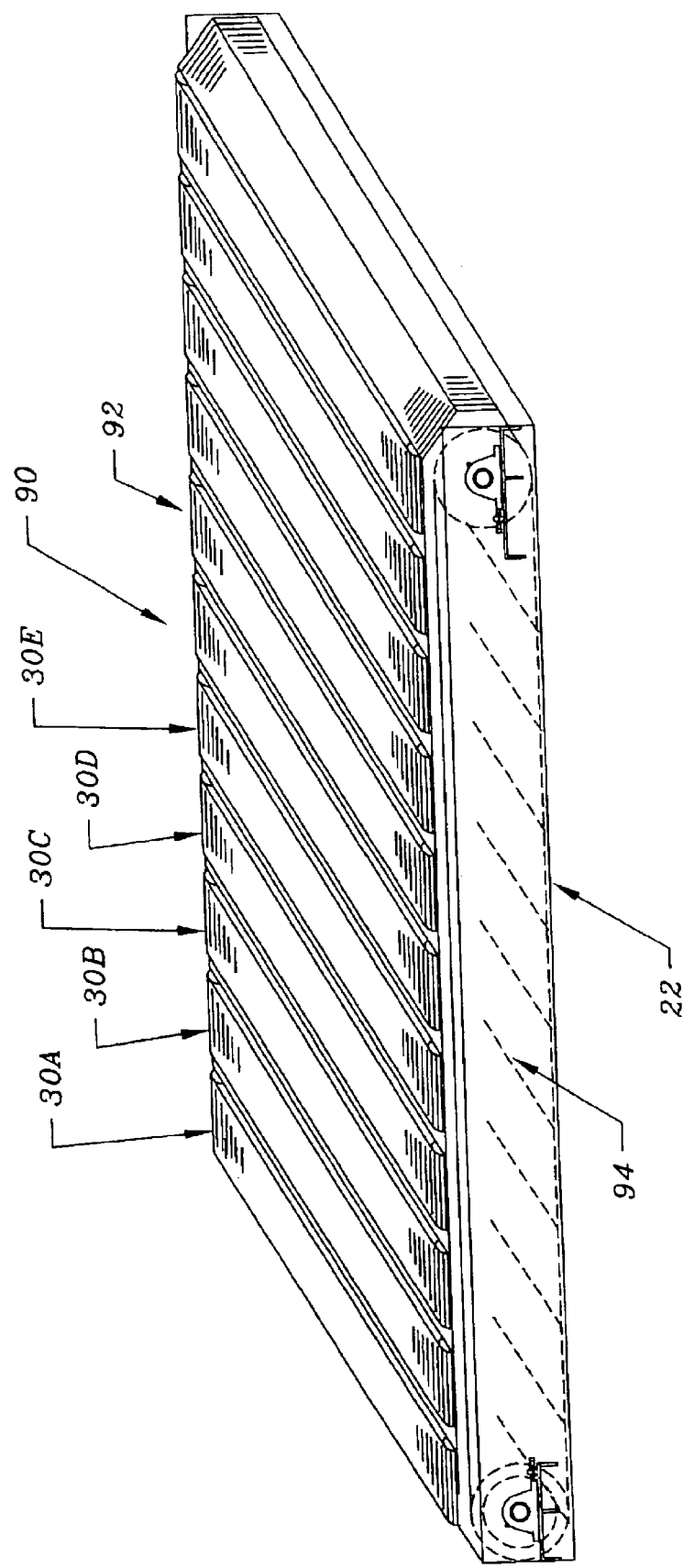
FIG. 1 depicts a side view perspective the endless loop, within the scope of the present invention.

FIG. 1 depicts a side view perspective the endless loop of a sorter within the scope of the present invention. The plurality of interconnected carriers (30A, 30B, 30C, 30D, 30E, etcetera) create endless loop (90), and as portrayed, endless loop (90) circulates with its upper half (92) positioned above its lower half (94). A drive (not shown) advances or circulates the endless loop (90). In other embodiments of the present invention, an endless loop can be configured to circulate in a side-by-side arrangement rather than an over-and-under design.

Frame (22) can be manufactured from any material suitable in the art. And as will be later enabled and disclosed, frame (22) supports the sorter's drive, lines, crossovers and receivers, as well as the required circuitry for controlling diversion of the followers. A controller (not shown), such as a computer program, correlates advancement of the sorter and the diversion of the followers.

Figure 2:
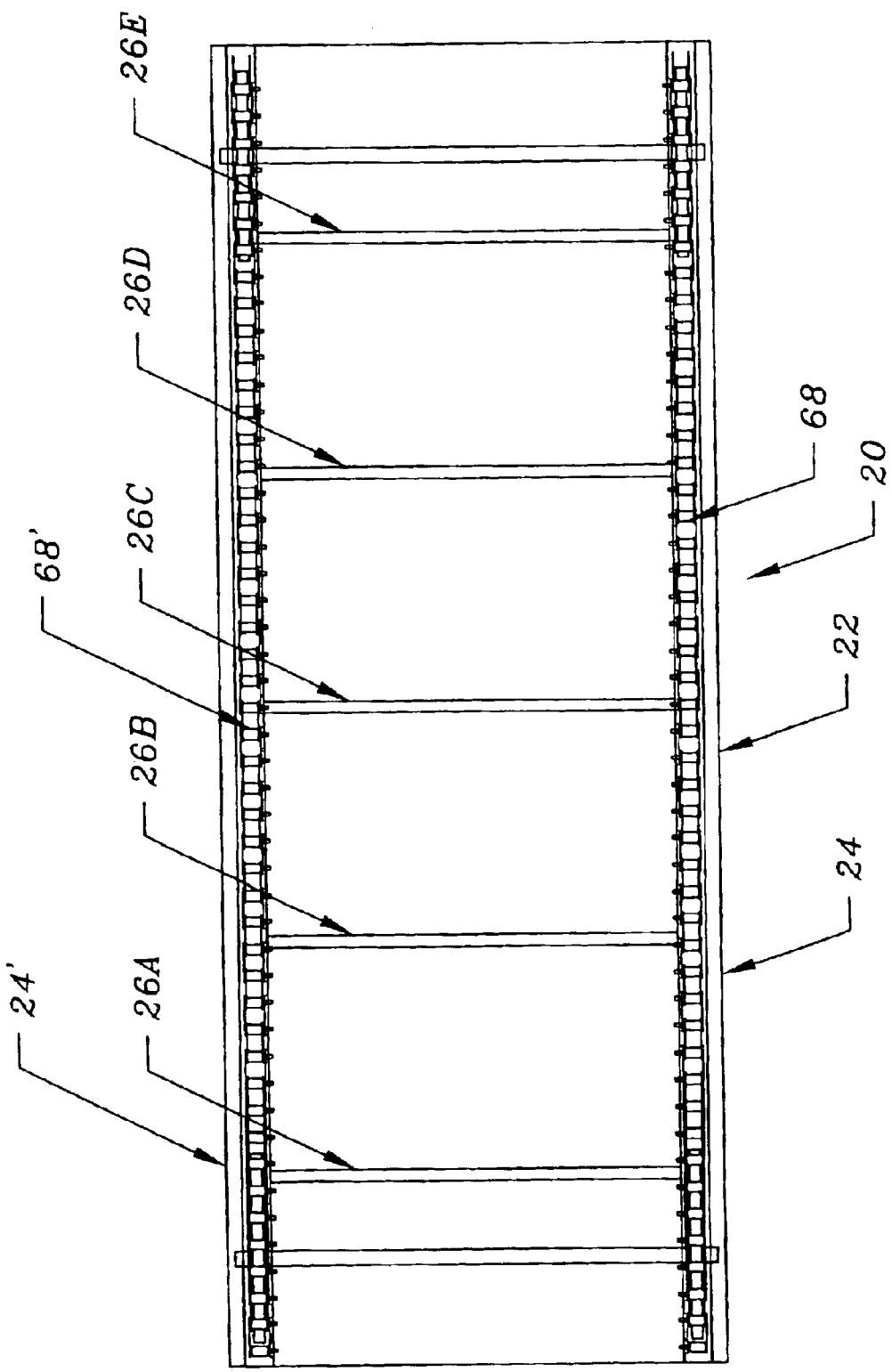
FIG. 2 is another representation of a sectional top view of sorter.

FIG. 2 is a sectional top view of sorter (20) having its carriers, lines, crossovers, diverters, receivers and switches cutaway. Frame (22) includes a pair of side rails (24 and 24'). Extending between side rails (24 and 24') are cross members (26A, 26B, 26C, 26D and 26E). Positioned near side rail (24) and above cross-members (26A, 26B, 26C, 26D and 26E) is drive member (68). Located near side rail (24') and above cross members (26A, 26B, 26C, 26D and 26E) is drive member (68'). As illustrated, each drive member (68, 68') is a chain. However, within the scope of the present invention, other types of drives can be utilized to advance endless loop (90).

Figure 3:
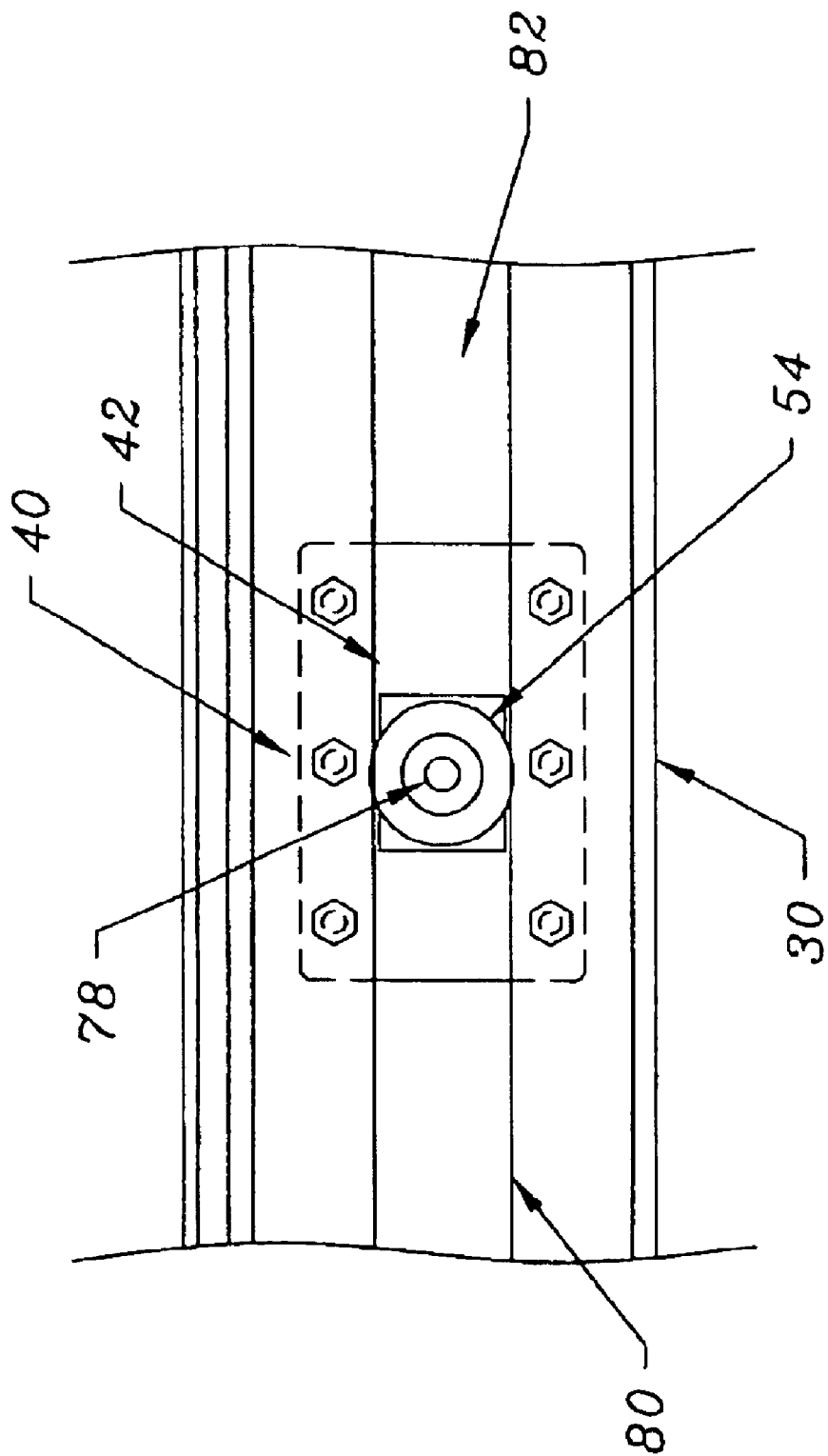
FIG. 3 is a bottom view of an embodiment of a follower, within the scope of the present invention.

FIG. 3 is a sectional bottom view of an embodiment of the present invention. Clasp (42) of follower (40) tracks in guide bearing (80) of carrier (30). Depending downward from clasp (42) is rider (78). Clasp (42) can be provided with grooves (not shown) for rider (78). With a view toward FIGS. 3, 4, 5, 7, 8, 10 and 11, it is disclosed that clasp (42) of follower (40) rides within guide bearing (80) of carrier (30), and rider (78) depends downward through slit (82) of guide bearing (80).

Figure 4:
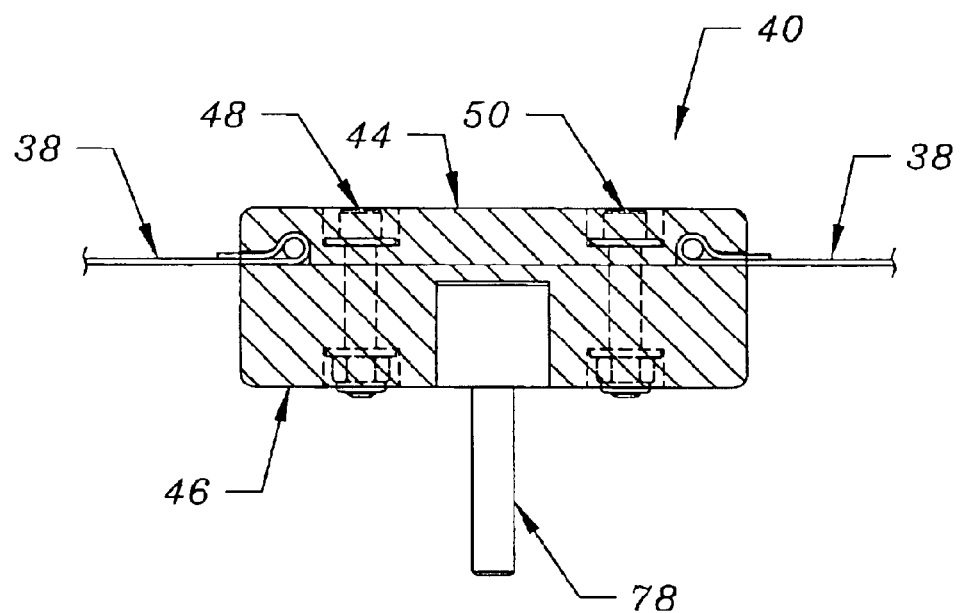
FIG. 4 is a lateral view of a follower's clasp of the present invention.

Turning to FIG. 4, a side view of an embodiment of clasp (42) of the present invention is portrayed. Clasp (42) of follower (40) includes upper section (44) and lower section (46). Upper section (44) and lower section (46) clasp belt (38) about the slat (not shown). In other words, the upper section (44) of clasp (42) is proximate the lower planar side of the slat (not shown) while rider (78) depends downward from follower (40). In this particular embodiment, bolts (48) and (50) secure upper section (44) of clasp (42) to lower section (46) of clasp (42). However, other means can be utilized to secure upper section (44) of clasp (42) to lower section (46) of clasp (42).

Figure 5:
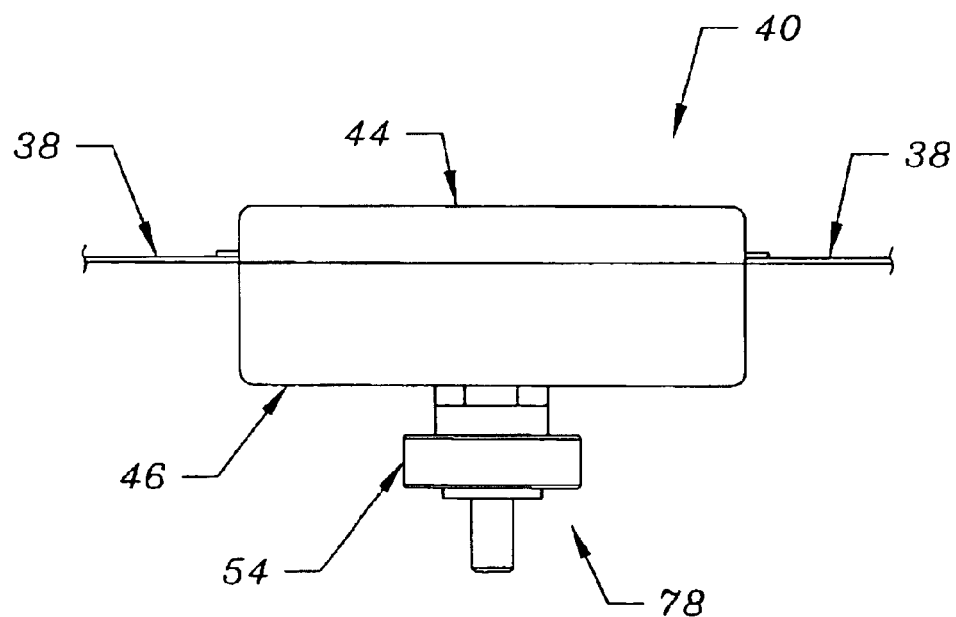
FIG. 5 is another view of a second type of follower, within the scope of the present invention.

Another embodiment of the present invention's follower is disclosed in FIG. 5. Follower (40) includes rider (78) depending downward from lower section (46) of clasp (42). Rider (78) is further provided with depending bearing (54). As best indicated by the FIG. 12 cutaway, in operation, rider (78) and depending bearing (54) are directed by either lines, crossovers, diverters, receivers and/or switches. However, those skilled in the art, understand that follower (40) can be driven by electromagnetic induction. For example, a magnet (not shown) can be attached or incorporated into lower section (46) of clasp (42). Thus, follower (40) can respond to the electromagnetic activation.

Figure 6:
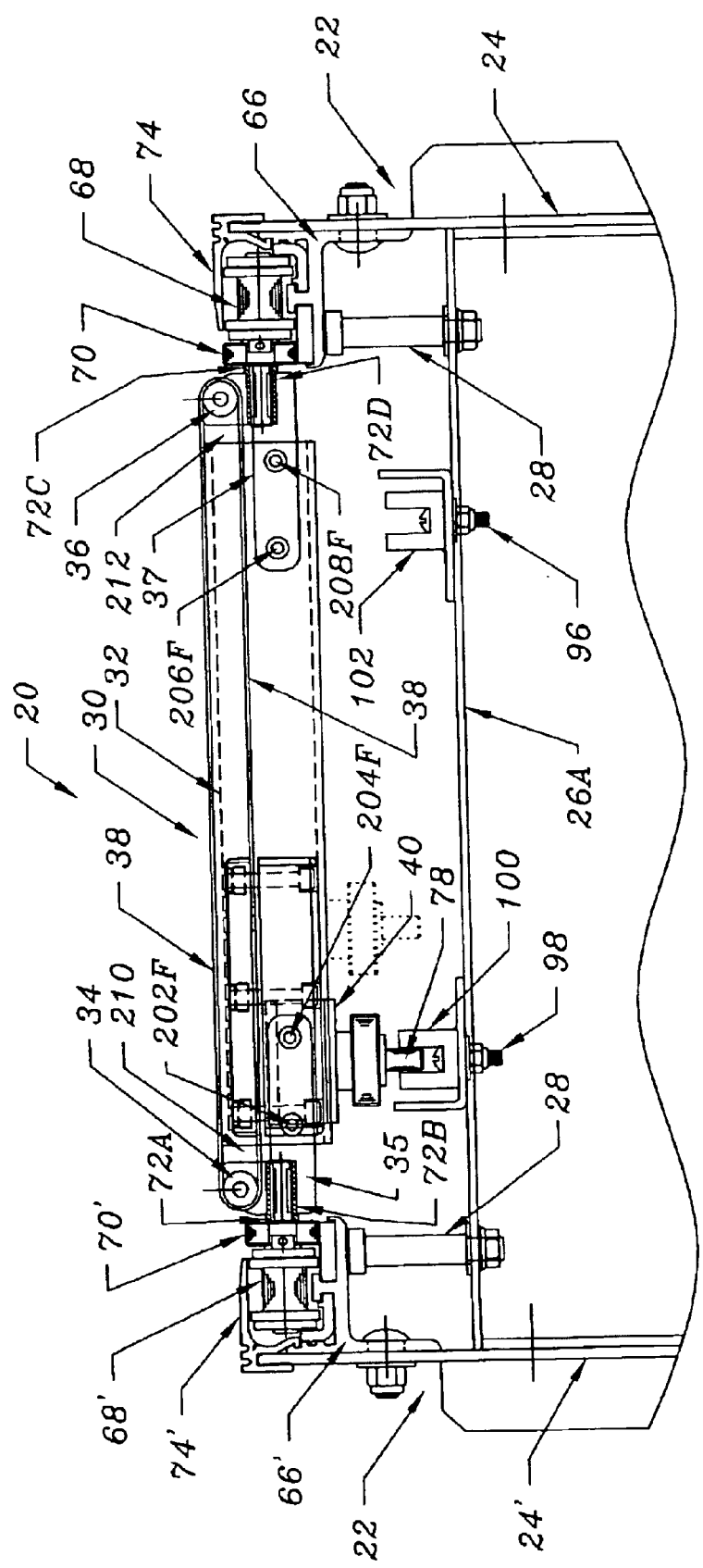
FIG. 6 is a frontal perspective of the sorter showing the upper half of the endless loop.

FIG. 6 is a frontal perspective of sorter (20) showing the upper half (92) of endless loop (90). Only the structural elements associated with a single carrier (30) of the plurality of carriers (30 A, B, C, D, E, etcetera) of endless loop (90) are portrayed in the view. Other carriers of the plurality of carriers (30 A, B, C, D, E, etcetera) of endless loop (90) can have comparable, if not identical, structures. And although not shown, as endless loop (90) circulates lower half (94) is controlled and guided in any manner acceptable in the art, including such configurations, as catenary take-ups.

With a view still toward FIG. 6, frame (22) supports line (100) and carrier (30). Cross-member (26A) secures side rail (24') to side rail (24). Bolt (98) attaches line (100) to cross-member (26A) and bolt (96) affixes line (102) to cross-member (26A). Drive (68') rides along platform (66') that extends inward from side rail (24') of frame (22), and drive (68) rides along platform (66) that extends inward from side rail (24) of frame (22). In this particular embodiment, braces (28) and (28') extend respectively between cross-member (26A) and platforms (66) and (66').

At a first side of sorter (20), couplers (72A and 72B) of connector (70') connect carrier (30) to drive (68'). Cover (74') extends over drive (68') and inward from side rail (24'). At a second side of sorter (20), couplers (72C and 72D) of connector (70) connect carrier (30) to drive (68). Cover (74) extends over drive (68) and inward from side rail (24). Connectors (70' and 70) can be made in a generally U-shape to bend respectively about ends (35) and (37) of slat (32) of carrier (30).

In this specific view, carrier (30) includes slat (32), roller (34), roller (36), belt (38) and follower (40). Roller (34) is disposed at the opposite end of slat (32) from roller (36). Connector (70') can support slat (32) and also include bracket (not shown) to support roller (34). Similarly, connector (70) can support slat (32) and also include bracket (not shown) to support roller (36). In other embodiments, slat (32) can be manufactured to incorporate first outwardly curved edge and second outwardly curved edge (not shown), thereby eliminating the rollers (34, 36).

As revealed in this frontal perspective, slat (32) can be equipped with apertures (not shown) to receive bolts (202F), (204F), (206F) and (208F) for coupling connectors (70' and 70) to slat (32). Although not shown, those skilled in the art recognize that the reward side of slat (32) can also be equipped with apertures for receiving bolts (202R), (204R), (206R) and (208R). The slat, bolt, aperture combination allows for adjustment of the tension on belt (38) of carrier (30). Thus, by increasing or decreasing the widths of spaces (210 and 212), the tension on belt (38) is modified.

With a view still toward FIG. 6, rider (78) of follower (40) depends downward and engages line (100). Follower (40) will travel along line (100) until diverted onto a crossover (not shown). Upon diversion, follower (40) imparts transverse motion to belt (38), until follower (40) engages line (102). In other words, follower (40) moves belt (38) about the lengthwise periphery of slat (32). And in this particular embodiment, the lengthwise periphery of slat (32) is parallel to the cross-member (26A). Thus, when follower (40) is diverted from line (100) to line (102) transverse motion is imparted to belt (38) such than an item to be sorted is moved in an opposite direction from line (102). And when predetermined paradigms require, a series of followers (40A, 40B, 40C, etcetera) can be diverted from line (100) to line (102). By way illustration and within the scope of the present invention, a series of followers can be diverted when the item to be sorted has a size greater than the width of a single carrier's belt.

FIG. 7 is a side view of a section of endless loop (90) of sorter (20), with frame (22), cross-members (26), drive (68) and couplers (72A, 72B, etcetera) of connectors (70) cut away. Belts (38A), (38B), (38C) and (38D) are fitted and wrapped about the lengthwise periphery of their corresponding slats (not shown) of carriers (30A), (30B), (30C) and (30D). Depending downward respectively from each carrier (30 A, B C and D) are riders (78 A, B, C and D) including depending bearings (54 A, B, C and D). Riders (78 A, B, C and D) can travel the length of their corresponding slits (82 A, B, C and D) of guide bearings (80 A, B, C and D). As shown in FIG. 7, carriers (30A), (30B), (30C) and (30D) are configured to show their forward pivoting ability, while in FIG. 8, carriers (30A), (30B) and (30C) are shown in a reverse pivot configuration, such as carriers (30A), (30B) and (30C) may encounter when traversing the previously enabled lower half of the endless loop.

As shown in FIG. 7, the vertical lines of zone X represent the narrowest hiatus separating (30A) from carrier (30B). The vertical lines of zone Y represent the narrowest hiatus between carrier (30B) and carrier (30C) while the lines of zone Z represent the hiatus separating carrier (30C) from carrier (30D). It has been determined that the distance for each of the zones X, Y or Z, etcetera, can be dimensioned to be twenty millimeters or less.

Figure 9:
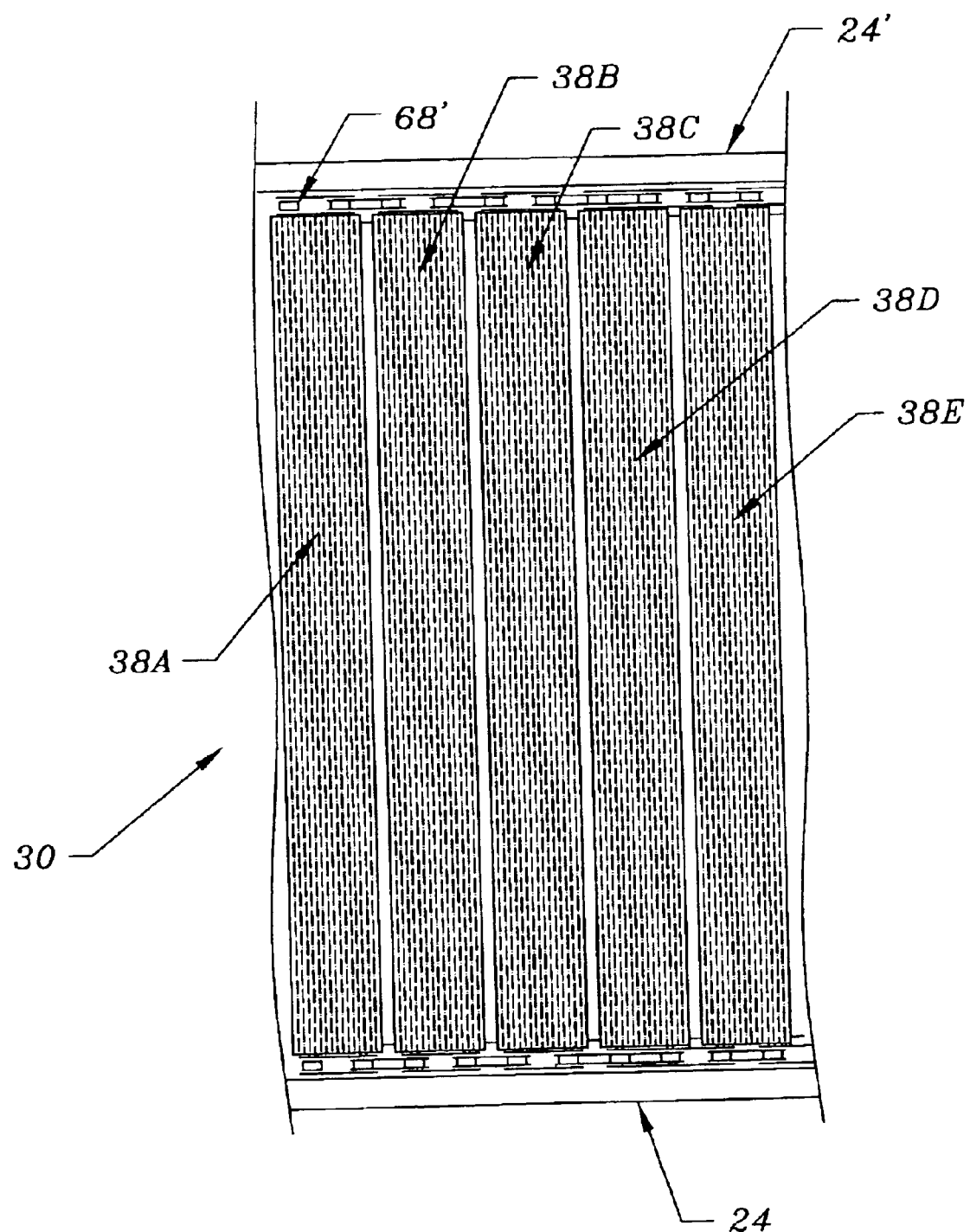
FIG. 9 is a top plan view of a section of the endless loop.

FIG. 9 is a top plan view of a section of endless loop (90). From this perspective, it seen that the distances between belts (38A) and (38B), belts (38B) and (38C), belts (38C) and (38D), and belts (38D) and (38E) are virtually eliminated. In fact, the hiatuses of each zones X, Y, Z, so forth and so on, are limited only by the structural parameters necessary for any of the plurality of carriers (30 A, B, C, D, E, etcetera) to freely reverse pivot, as endless loop (90) is circulated.

In FIG. 10, a sectional side view of another embodiment of the present invention is disclosed. Belts (38A), (38B), (38C) and (38D) are wrapped about the lengthwise periphery of their corresponding slats (32A), (32B), (32C) and (32D) of their respective carriers (30A), (30B), (30C) and (30D). As shown, gap (76A) is between carriers (30A) and (30B); gap (76B) is between carriers (30B) and (30C); and gap (76C) is between carriers (30C) and (30D). Portion (39B) of belt (38B) protrudes over the lengthwise edge (37B) of slat (32B) to contact slat (32A) thereby preventing items to be sorted from falling into gap (76A). In a similar manner, portion (39C) of belt (38C) protrudes over the lengthwise edge (37C) of slat (32C) to contact slat (32B) to prevent items from falling into gap (76B) while portion (39D) of belt (38D) protrudes over the lengthwise edge (37D) of slat (32D) to contact slat (32C) to prevent items from falling into gap (76C).

With reference still to FIG. 10, depending downward respectively from each carrier (30 A, B, C and D) are riders (78 A, B, C and D) including depending bearings (54 A, B, C and D). Clasps (42 A, B, C and D) of followers (40 A, B, C and D) ride in guide bearings (80 A, B, C and D). And riders (78 A, B, C and D) can travel the approximate length of their corresponding slits (82 A, B, C and D) of guide bearings (80 A, B, C and D). As shown in FIG. 10, carriers (30A), (30B), (30C) and (30D) are configured to show their forward pivoting ability which will occur when carriers (30A), (30B), (30C) and (30D) are advancing in the upper half (92) of endless loop (90). In FIG. 11, carriers (30A), (30B) and (30C) are shown in a reverse pivoting configuration that occurs, if necessary, when carriers (30A), (30B) and (30C) are advancing in the lower half (94) of endless loop (90).

Figure 12:
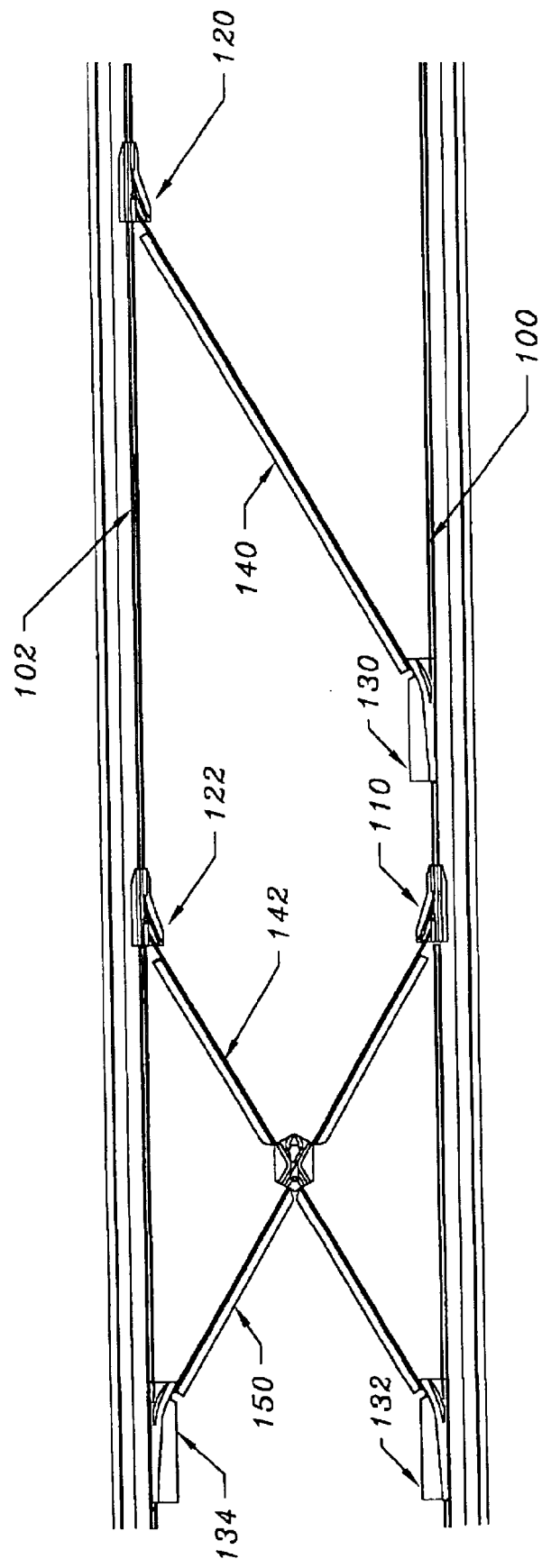
FIGS. 12 is a schematic representations of lines, diverters and crossovers of an embodiment of the present invention.

Applicant has previously disclosed mechanical structures for guiding followers (40 A, B, C, D, etcetera) of carriers (30 A, B, C, D, etcetera), but followers (40 . . . ) can also be guided by electromagnetic induction. With that in mind, FIG. 12 is a representation of lines, diverters, crossovers, receivers and switches of an embodiment of the present invention that can be used to guide the followers (40 A, B, C, D, etcetera) of sorter's carriers (30 A, B, C, D, etcetera) of endless loop (90). However, as will be set forth with hereinafter, other configurations of lines, diverters, crossovers, receivers and switches are within the scope of the present belt sorter.

Returning to FIG. 12, line (100) includes diverter (110). Line (102) intersects diverter (120) and diverter (122). Crossover (140) runs from diverter (120) to receiver (130) of line (100), and crossover (142) runs from diverter (122) to receiver (132) of line (100). Crossover (150) runs from diverter (110) of line (100) to receiver (134) of line (102). Select embodiments can also incorporate switch (170) at the junction of crossover (142) and crossover (150).

Figure 13:
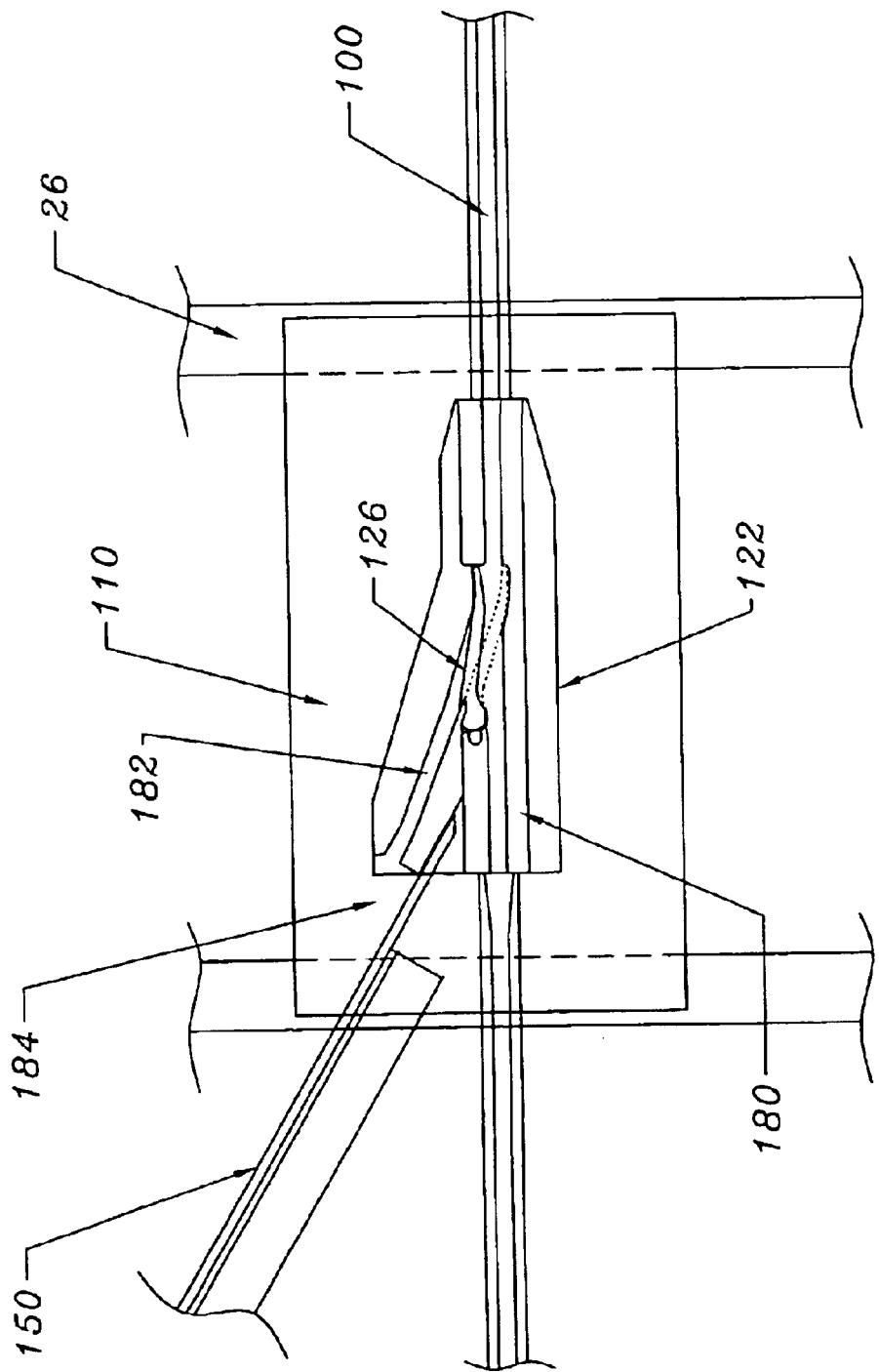
FIG. 13 is a top perspective of a diverter, within the scope of the present invention.

FIG. 13 is a top perspective of a type of diverter (110) that can be utilized to practice the present sorter. However, it is to be understood that other diverter structures are within the scope of the current invention. Diverter (110) is attached to cross-member (26) through any manner acceptable in the art. Although not shown, the diverter (110) is linked to the controller via the necessary circuitry. Diverter (110) is constructed of metal or plastic and is designed to include channel continuance (180) fitted and aligned with line (100). Upon activation gate (126) closes channel continuance (180) and diverts follower (not shown) into divert groove (182) leading to crossover (150).

The current invention can be utilized to sort items, to maintain the orientation of items moving along the sorter, to alter the orientation of items traveling along the sorter or for any of the various combinations thereof for a plethora of items of differing sizes. When the size of the item to be sorted is smaller than the width of belt (38) of carrier (30), a diverter can divert a single follower (40) from a line to a crossover, but when the item is larger than the width of a single belt, a combination of followers (40 . . . ) can be diverted to sort, alter or maintain the orientation of the item. And by utilizing the gap-eliminating embodiments of the present sorter, the protruding belts (38 A, B, C, D, etcetera) of carriers (30 A, B, C, D, etcetera) prevent the smaller items and/or smaller parts of the larger items from falling into gaps (76 A, B, C, D, etcetera).

A controller, such as, a computer program, and its corresponding circuitry (not shown) control diversion of the endless loop's carriers' followers. Predetermined parameters determine the numerous configurations for the layouts of the current sorter's lines, crossovers, diverters, receivers and routers; and in accordance with a paradigm, the sorter's diverters divert one or more of the followers (40 A, B, C, D, etcetera). Diversions of the followers (40 . . . ) move their corresponding belts (38 . . . ) about the lengthwise periphery of their corresponding slats (32 . . . ).

As will be disclosed with greater particularity below, routers include clusters of diverters, receivers, crossovers and any required switches positioned beneath the upper surface of endless loop (90). In select embodiments, the crossovers of the router's cluster are generally parallel to the other crossover members, but in other embodiments, the router's cluster of crossovers can include at least one crossover member that intersects the remaining members of the cluster of crossovers. Still other embodiments of the present invention can include routers having crossover members that are neither intersecting or parallel to the other members of the cluster's crossovers. And depending upon engineering considerations, one or more routers can be incorporated into the practice of the present sorter and methods of using the sorter.

When the size of the item to be sorted is larger than the width of a single belt (38) of a single carrier (30), the controller can activate the diverter or router to divert a series of sequential followers (40 A, B, C, D, etcetera) from a line to a crossover or crossovers. The controller can also activate the diverter or router to simultaneously divert followers (40 A, B, C, D, etcetera) from a line to the crossovers. In other embodiments, sorters including multiple diverters or routers can concurrently divert followers simultaneously and in sequence.

Figure 14:
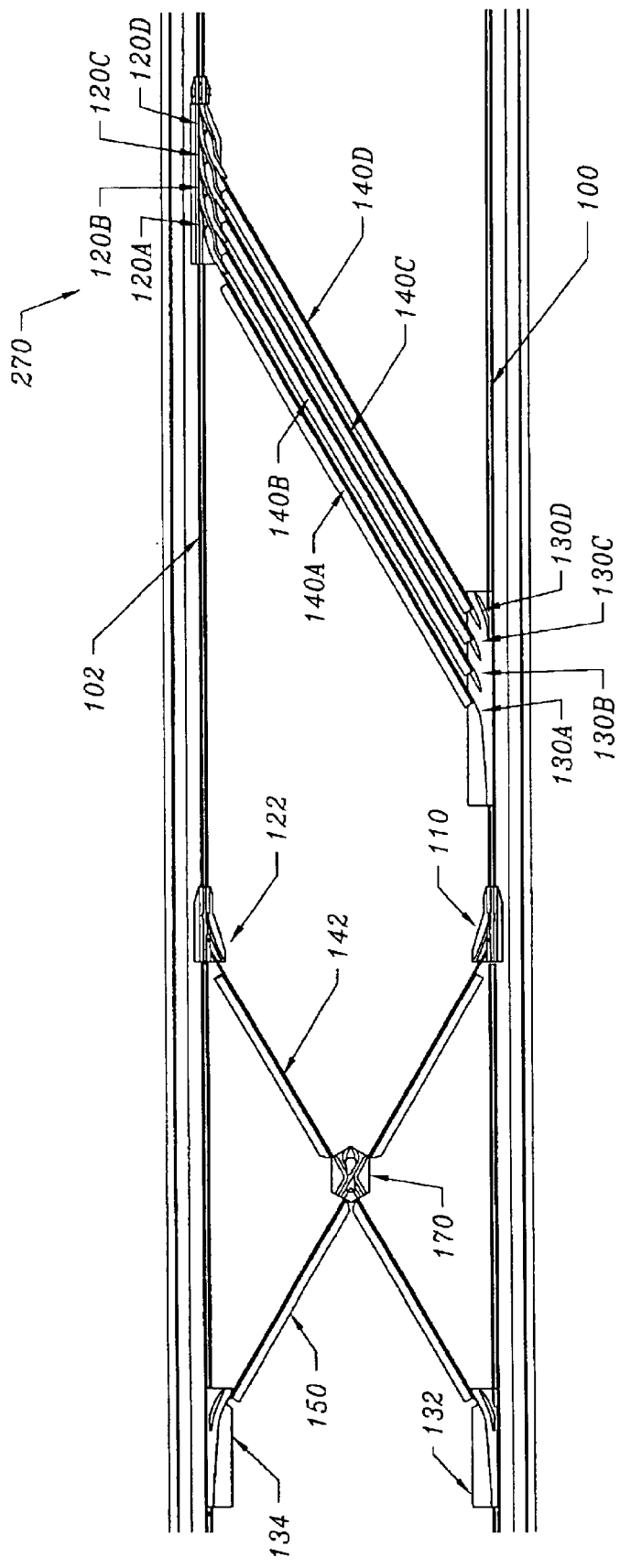
FIGS. 14 is a representation of a router, lines, diverters and crossovers of an embodiment of the present invention.

Although the carriers (30 . . . ) of the sorter (20) are not shown in FIG. 14, diversion of followers (40 . . . ) move corresponding belts (38 . . . ) about the peripheries of slats (32 . . . ). Movement or non-movement of the sorter's belts can alter or maintain the orientation of the items being carried by the endless loop, received onto the endless loop or diverted away from the endless loop. In accord with the present invention, belts (38 . . . ) movement about their corresponding slats can be in the direction of an oncoming ingressed item, toward the oncoming ingressed item or in the direction of an item being egressed away from the sorter. In select embodiments, movement of belts (38 . . . ) can generate an orthogonal simultaneous movement of the belts.

With carriers (30A, B, C, D, etcetera) of sorter (20) cutaway, FIG. 14 is a top view representation of a type of router within the scope of the present invention. Router (270) includes a cluster of diverters (120A, 120B, 120C and 120D), a cluster of receivers (130A, 130B, 130C and 130D), their corresponding crossovers (140A, 140B, 140C and 140D) for directing any diverted follower from line (102) to line (100) and the circuitry (not shown) connecting the diverters (120A, 120B, 120C and 120D) to the sensor or sensors (not shown) and the controller (not shown). Depending upon the predetermined paradigm, router's (270) diverters (120A, 120B, 120C and 120D) can be actuated simultaneously or sequentially. And within the scope of the present invention, routers can include more or less than four clustered diverters, corresponding crossovers and their corresponding receivers. By way of example, a router can include two, four, six, eight or more clustered diverters, corresponding crossovers and their corresponding receivers.

As portrayed in FIG. 14, router's (270) crossovers (140A, 140B, 140C and 140D) crossovers are in a general parallel orientation to each other. However, as previously disclosed, other embodiments of the present invention can include one or more crossovers that are not in parallel spatial relationship, e.g., one or more crossovers can perpendicularly intersect a cluster of parallel crossovers, or a cluster of crossovers can be configured in a non-parallel spatial relationship.

Figure 15A:
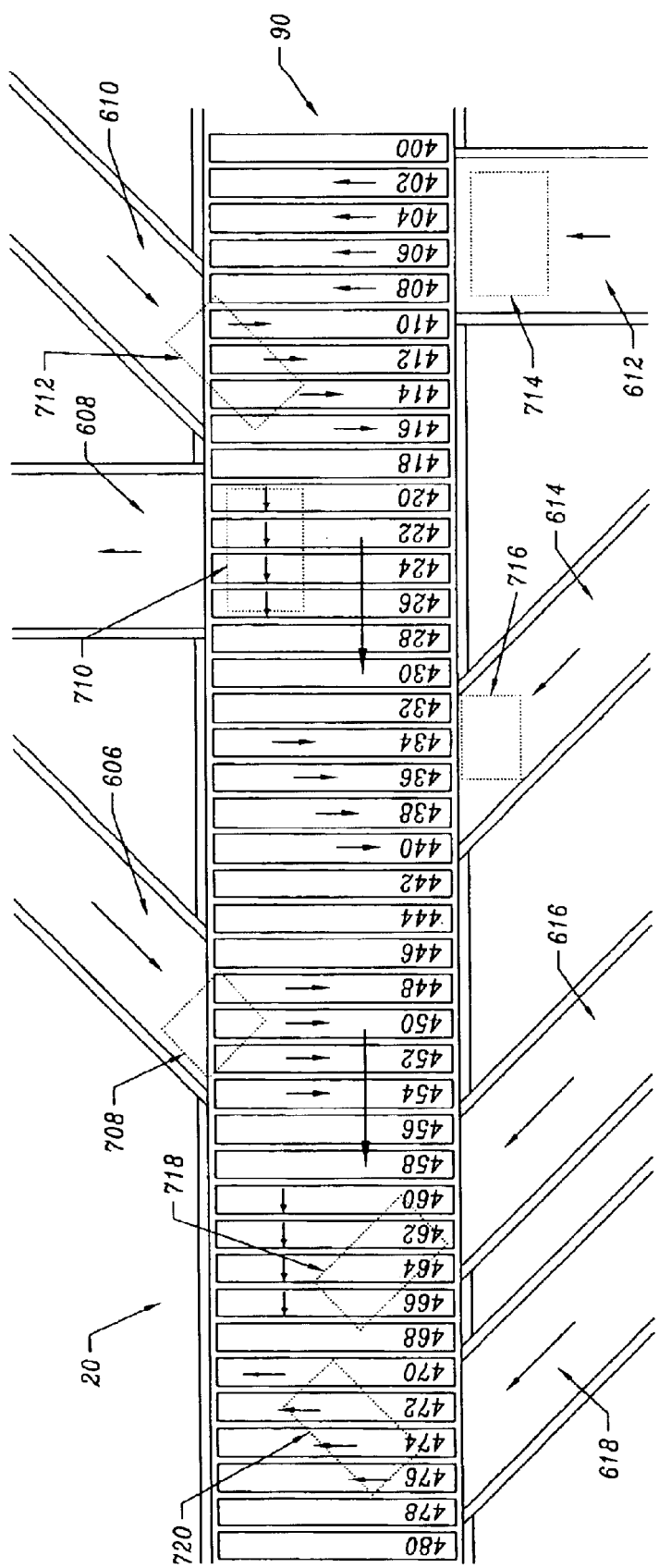
FIGS. 15A and 15B are a top view of a sorter within the scope of the present items.
Figure 15B:
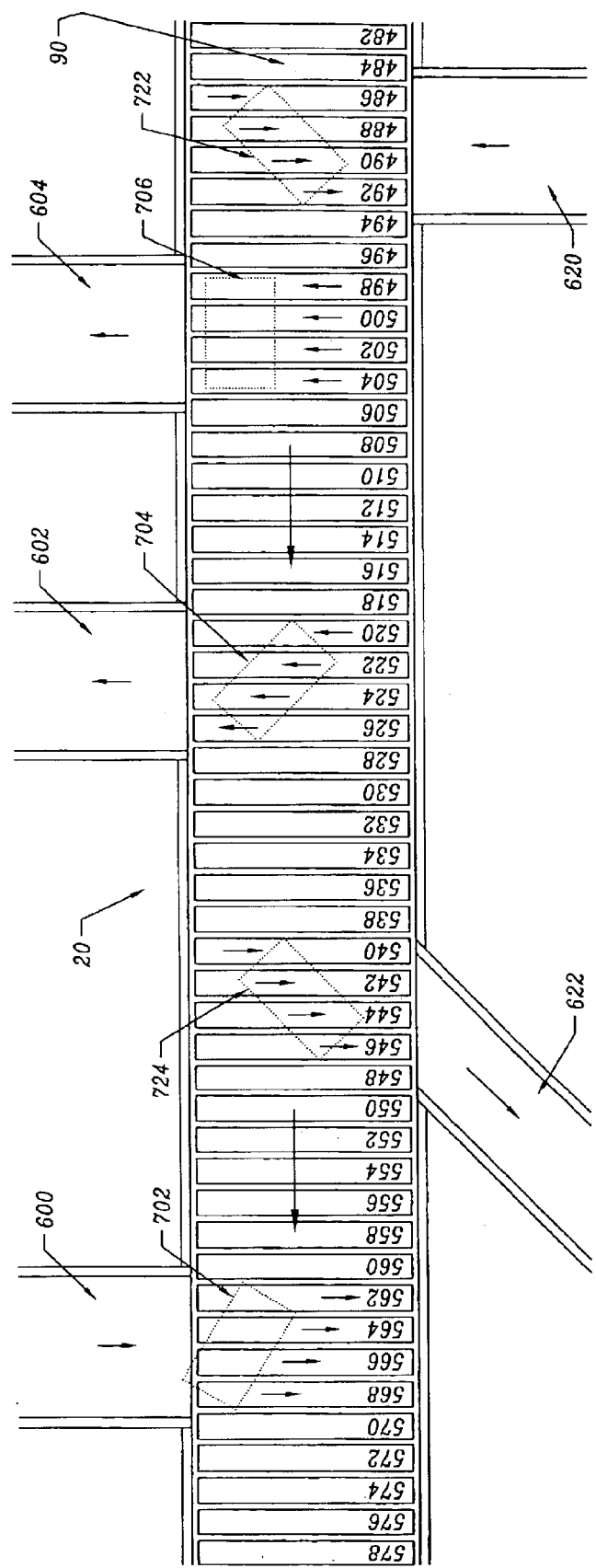

Although the routers are not shown in this view, FIGS. 15A and 15B are representations of sorter (20) having a plurality of routers where the routers are similar or identical to router (270) previously enabled. In this specific embodiment, the routers, of endless loop (90), are positioned beneath the plurality of carriers that carry the items for sortation. Carriers' belts (400) though (578) are shown in this top view. The directional arrows associated with belts (400) through (578) reveal the sideways movement or non-movement of the belts about their respective carriers' slats as endless loop (90) is advanced. Due to both the frontal and lateral loading capabilities of the present sorter, a multitude of items can have their orientations altered in accordance with a predetermined paradigm.

As disclosed in FIGS. 15A and 15B, sorters of the present invention can move, receive or divert items in various directions. By way of illustration, for a single moment in time, sorter (20) can accomplish the following:

a) item (702) traveling off of perpendicular ingress (600) encounters endless loop (90) and belts (562, 564, 566 and 568) move sequentially in the direction of the oncoming ingressing item (702) to alter the orientation of item (702) as item (702) contacts endless loop (90);

b) belts (520, 522, 524 and 526) move sequentially diverting item (704) traveling along endless loop (90) toward perpendicular egress (602);

c) belts (498, 500, 502 and 504) move simultaneously to orthogonally divert item (706) traveling along endless loop (90) toward egress (604);

d) item (708) traveling off of lateral ingress (606) encounters endless loop (90) and belts (448, 450, 452 and 454) move simultaneously in the direction of oncoming ingressing item (708);

e) belts (420, 424, 426 and 428) do not move about the peripheries of their corresponding slats when item (710) is ingressed from perpendicular ingress (608) onto endless loop (90);

f) item (712) traveling off of lateral ingress (610) encounters endless loop (90) and belts (410, 412, 414 and 416) move sequentially in the direction of oncoming ingressing item (712) to alter the orientation of item (712) as item (712) contacts endless loop (90);

g) prior to item (714) traveling off of perpendicular ingress (612) and encountering endless loop (90), belts (402, 404, 406 and 408) move simultaneously in the direction of oncoming item (714) to receive oncoming item (714);

h) prior to item (716) traveling off of lateral ingress (614) and encountering endless loop (90), belts (434, 436, 438 and 440) move sequentially toward oncoming item (716) to alter the orientation of item (716) as item (716) contacts endless loop (90);

i) item (718) traveling off of lateral ingress (616) encounters endless loop (90) and belts (460, 462, 464 and 466) do not move about the peripheries of their corresponding slats;

j) item (720) traveling off of lateral ingress (618) encounters endless loop (90) and belts (470, 472, 474 and 476) move sequentially in the direction of oncoming item (720) to alter the orientation of item (720) as item (720) contacts endless loop (90);

k) item (722) traveling off of perpendicular ingress (620) encounters endless loop (90) and belts (486, 488, 490 and 492) move sequentially toward the oncoming item (772); and l) belts (540, 542, 544 and 546) move sequentially diverting item (724) traveling along endless loop (90) toward lateral egress (662).

Those skilled in the art recognize that a perpendicular egress is a specific kind of lateral egress while a perpendicular ingress is a specific type of lateral ingress. Moreover, the present sorter can be configured and programmed to alter the spatial orientation of items while items are advanced by the sorter, while items are ingressed onto the sorter, after items have been ingressed onto the sorter, while items are egressed from the sorter and prior to items being egressed away from the sorter.

Steps associated with the practice of the methods of present invention utilizing select structural elements enabled above are set forth in FIGS. 16–22. Having disclosed the invention as required by Title 35 of the United States Code, Applicants now pray respectfully that Letters Patent be granted for their invention in accordance with the scope of the claims appended hereto.

What is claimed is:

1. A sorter for sorting a plurality of items, comprising:
    a) an endless loop having an upper half positioned above a lower half;
    b) said endless loop further comprising a plurality of carriers circulating about said endless loop, wherein one or more of said carriers further comprises:
        i) a slat further including:
            A) a first widthwise edge;
            B) a second widthwise edge;
            C) a first lengthwise edge; and
            D) a second lengthwise edge;
        ii) a belt having a length approximate a lengthwise periphery of said slat;
        iii) a follower proximate said slat, including a rider:
            A) for clasping said belt about said slat; and
            B) for moving said belt about said lengthwise periphery of said slat;
        iv) a first connector at said first side of said carrier; and
        v) a second connector at said second side of said carrier;
    c) a plurality of lines for directing advancement of any of said plurality of carriers' followers;
    d) a plurality of crossovers, communicating with at least two of said plurality of lines, for guiding transversely, relative to said endless loop's advancement, any of said plurality of carriers' followers;
    e) a plurality of diverters corresponding to said plurality of crossovers for diverting one or more of said plurality of carriers' followers from any of said plurality of lines onto one or more of said plurality of crossovers;
    f) a drive coupled to said first connector and said second connector of each carrier of said plurality of carriers for advancing said endless loop;
    g) a frame supporting said endless loop, said plurality of lines, said plurality of crossovers and said plurality of diverters;
    h) a controller;
    i) a frontal ingress for said sorter; and
    j) a lateral ingress for said sorter.

2. The invention of claim 1 wherein one or more of said plurality of carriers' riders further comprise a depending bearing.

3. The invention of claim 2 wherein one or more of said plurality of carriers comprise a guide bearing for said follower.

4. The invention of claim 3 wherein each belt of said endless loop protrudes over a lengthwise edge of each carrier's slat of said endless loop such that a gap between each of said endless loop's plurality of carriers is virtually eliminated.

5. The invention of claim 4 wherein each said carrier of said endless loop is dimensioned to pivot about a reverse bend without obstructing its immediately preceding carrier or its immediately succeeding carrier.

6. The invention of claim 5 wherein each of said plurality of crossovers is parallel with every other of said plurality of crossovers.

7. A sorter for sorting a plurality of items, comprising:
a) an endless loop: said endless loop further comprising carriers, wherein one or more of said carriers further comprises
   i) a slat further including:
      A) a first widthwise edge;
      B) a second widthwise edge;
      C) a first lengthwise edge; and
      D) a second lengthwise edge;
   ii) a belt having a length approximate a lengthwise periphery of said slat;
   iii) a follower proximate said slat, including a rider:
      A) for clasping said belt about said slat; and
      B) for moving said belt about said lengthwise periphery of said slat;
   iv) a first connector at said first side of said carrier; and
   v) a second connector at said second side of said carrier;
c) a plurality of lines for directing advancement of any of said plurality of carriers' followers;
d) a plurality of crossovers, communicating with said plurality of lines, for guiding transversely, relative to said endless loop's advancement, any diverted carrier's follower;
e) a plurality of diverters, corresponding to said plurality of crossovers, for diverting a predetermined number of said carriers' followers onto a predetermined number of said plurality of crossovers;
f) a drive coupled to said first connector and said second connector of each said carrier for advancing said endless loop;
g) a sensor for detecting sizes of said plurality of items moving on said sorter;
h) a frame supporting said endless loop, said plurality of lines, said plurality of crossovers and said plurality of diverters; and
i) a controller.

8. The invention of claim 7 further comprising:
a) a frontal ingress for said sorter; and
b) a lateral ingress for said sorter.

9. The invention of claim 8 wherein one or more of said plurality of items is ingressed laterally onto said sorter such that upon contact between said endless loop and said one or more of said plurality of items, one or more of said carrier's belts do not move about lengthwise peripheries of their corresponding carrier's slats.

10. The invention of claim 8 wherein some of said carriers' followers are diverted and movement of said diverted followers about their corresponding slats results in a simultaneous diversion or a sequential diversion of belts corresponding to said diverted followers.

11. The invention of claim 10 wherein said simultaneous diversion occurs concurrently with a lateral ingress of one or more of said plurality of items onto said sorter.

12. The invention of claim 10 wherein said sequential diversion occurs concurrently with a lateral ingress of one or more of said plurality of items onto said sorter.

13. The invention of claim 12 wherein said sequential diversion is in a direction toward said one or more of said plurality of items ingressed onto said sorter.

14. The invention of claim 10 wherein said simultaneous diversion is orthogonal and occurs prior to a lateral egress of one of said plurality of items away from said sorter.

15. The invention of claim 10 wherein said sequential diversion occurs prior to a lateral egress of one of said plurality of items away from said sorter.

16. A sorter for sorting a plurality of items, comprising:
a) an endless loop: said endless loop further comprising carriers, wherein one or more of said carriers further comprises:
   i) a slat further including:
      A) a first widthwise edge;
      B) a second widthwise edge;
      C) a first lengthwise edge; and
      D) a second lengthwise edge;
   ii) a belt having a length approximate a lengthwise periphery of said slat, wherein said belt protrudes over a lengthwise edge of said slat such that a gap between each of said of carriers is virtually eliminated;
   iii) a follower, including a rider, for clasping said belt about said slat and for moving said belt about said lengthwise periphery of said slat;
b) a drive coupled with each carrier of said plurality of carriers;
c) a plurality of lines for directing advancement of any of said plurality of carriers' followers;
d) a router positioned beneath an upper surface of said endless loop and communicating with said plurality of lines for diverting transversely, according to a predetermined paradigm, one or more of said endless loop's carriers' followers, wherein said router further comprises:
   i) a plurality of diverters; and
   ii) a plurality of crossovers corresponding to said plurality of diverters;
e) a sensor for detecting sizes of said plurality of items;
f) a controller for actuating said plurality of diverters according to said predetermined paradigm; and
g) a frame supporting said endless loop, said drive, said plurality of lines and said router.

17. The invention of claim 16 further comprising:
a) a frontal ingress;
b) one or more lateral ingresses; and
c) one or more lateral egresses.

18. The invention of claim 17 wherein at least a portion of said router's crossovers are in parallel orientation to each other.

19. The invention of claim 18 further comprising more than one said router.

20. The invention of claim 19 further comprising:
a) a first roller mounted to said first widthwise edge of each said slat; and
b) a second roller mounted to said second widthwise edge of each said slat.

21. The invention of claim 20 wherein one or more of said plurality of items is ingressed laterally onto said sorter such that upon contact between said endless loop and said one or more of said plurality of items, one or more of said carrier's belts do not move about lengthwise peripheries of their corresponding carrier's slats.

22. The invention of claim 20 wherein one or more of said routers causes a sequential diversion of followers and their corresponding belts for adjusting orientation of one or more of said plurality of items.

23. The invention of claim 22 wherein one or more of said routers causes a simultaneous diversion of followers and their corresponding belts for adjusting orientation of one or more of said plurality of items.

24. The invention of claim 20 wherein one or more of said routers cause a simultaneous diversion of followers and their corresponding belts for adjusting orientation of one or more of said plurality of items.

25. The invention of claim 20 wherein one or more of said routers cause simultaneous or sequential diversions of followers and their corresponding belts for adjusting orientation of one or more of said plurality of items.

26. A method of controlling orientation of items traveling along an endless loop of a sorter, comprising the steps of:
   a) providing a frame for said endless loop;
   b) mounting a plurality of lines to said frame;
   c) securing a router to said frame such that said router communicates with said plurality of lines and wherein said router further comprises:
      i) a plurality of crossovers; and
      ii) a plurality of diverters;
   d) creating a plurality of carriers comprising said endless loop, wherein creation of one or more of said plurality of carriers further comprises the steps of:
      i) wrapping a belt about a slat;
      ii) clasping securely said belt about said slat with a follower;
      iii) depending a rider from said follower;
      iv) forming a guide bearing beneath said slat for said follower;
      v) including a slit in said guide bearing for said follower; and
      vi) protruding said belt over a lengthwise edge of said slat;
   e) advancing said endless loop;
   f) loading said items onto said endless loop;
   g) sensing sizes of said items traveling along said sorter and reporting said sizes to a controller; and
   h) adjusting orientation of said items traveling along said sorter, according to a predetermined paradigm, by diverting transversely or by not diverting one or more of said followers when said followers encounter said router.

27. The method of claim 26 further comprising the steps of:
   a) ingressing laterally some of said items onto said sorter; and/or
   b) egressing laterally some of said items away from said sorter.

28. The method of claim 27 further comprising the steps of:
   a) securing a plurality of routers to said frame; and
   b) engineering said plurality of routers such that first portions of said routers' crossovers are in parallel relationship with each other.

29. The method of claim 28 further comprising the step of engineering said plurality of routers such that second portions of said routers' crossovers intersect with said first portions of said routers' crossovers.

30. The method of claim 28 further comprising the steps of:
   a) diverting simultaneously one or more of said followers concurrently with a lateral ingress of one or more of said items onto said sorter; and/or
   b) diverting sequentially one or more of said followers concurrently with a lateral ingress of one or more of said items onto said sorter; and/or
   c) diverting simultaneously one or more of said followers prior to a lateral egress of one of said items away from said sorter; and/or
   d) diverting sequentially one or more of said followers prior to a lateral egress of one of said items away from said sorter.

31. The method of claim 30 wherein the step of diverting sequentially one or more of said followers concurrently with a lateral ingress of one or more of said items onto said sorter is toward the ingressed item.

32. The method of claim 31 wherein the step of diverting simultaneously one or more of said followers prior to a lateral egress of one of said items away from said sorter is an orthogonal diversion.

* * * * *